Oct. 4, 1960   J. R. PESCHONG   2,954,634
FISH LURE
Filed Sept. 30, 1957
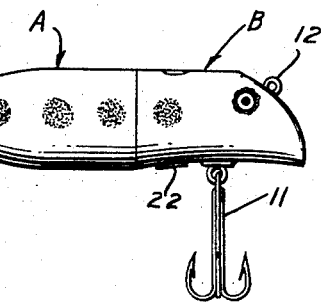
Fig. 1.
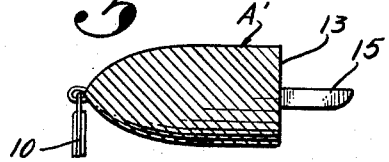
Fig. 2.
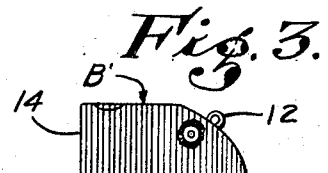
Fig. 3.
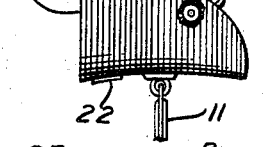
Fig. 4.
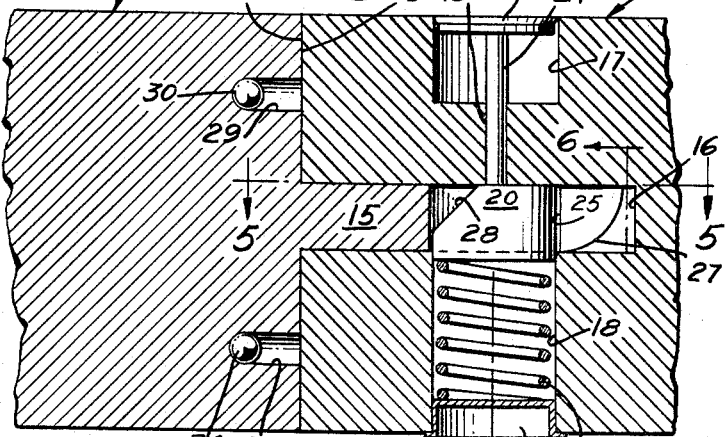
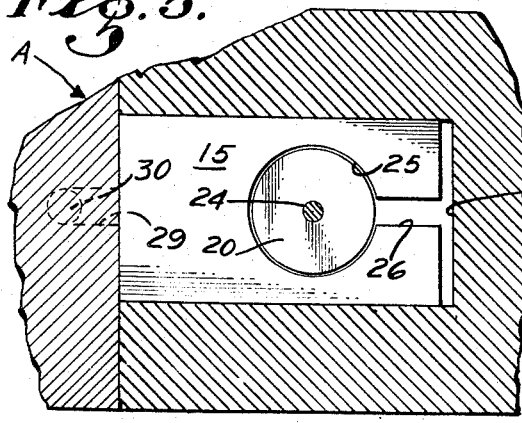
Fig. 5.   Fig. 6.
JOHN R. PESCHONG,
INVENTOR.
WHANN & McMANIGAL
Attorneys for Applicant

United States Patent Office 2,954,634
Patented Oct. 4, 1960

2,954,634

FISH LURE

John R. Peschong, 850 Haverford, Apt. 10,
Pacific Palisades, Calif.

Filed Sept. 30, 1957, Ser. No. 687,214

3 Claims. (Cl. 43—42.9)

The present invention relates generally to artificial fish lures, and is more particularly concerned with a lure of the plug type, the plug having a plurality of interchangeable parts by which its characteristics such as appearance, weight, action in the water, etc. may be varied at will.

It is one object of the herein described invention to provide a unique sectionalized plug wherein head and body sections are releasably interconnected, and retained against separation by manually releasable latching means.

A further object is to provide in a fish lure, head and body sections which are rigidly interconnected, yet may be easily and quickly released for separation or interchange with other head and/or body sections, so that by varying the interconnected head section or body section, the characteristics of the composite assembled plug may be varied through a wide range.

Still another object is to provide in a fishing plug, an arrangement of releasably itnerconnectible sections, one of these sections having open ended recesses for varying the disposition of sinkers to change the plug characteristics, these recesses being closed at their open end by the interconnected associated other section which thus forms a closure to prevent displacement of the sinkers from the recesses.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a side elevational view of a fish lure embodying the present invention;

Figs. 2 and 3 are side elevational views respectively showing a disengaged body section and head section of a plug such as illustrated in Fig. 1, except that the body section is lined to represent the color green, while the head section is lined to represent the color red;

Fig. 4 is an enlarged vertical sectional view through the joined ends of a head section and body section;

Fig. 5 is an enlarged fragmentary horizontal section, taken substantially on line 5—5 of Fig. 4; and Fig. 6 is an enlarged fragmentary transverse section, taken substantially on line 6—6 of Fig. 4.

Referring more specifically to the drawings, the present invention is illustrated as being incorporated into a fishing plug which is in general composed of an interconnected body section A and a head section B. In its broad concept, the invention invisions a plurality of head sections and body sections which may be interchangeably interconnected to provide different characteristics in the assembled plug. For example, the head section B, as shown in Fig. 1 may be interconnected with a green body section as shown in Fig. 2, and likewise a red head section as shown in Fig. 3 may be assembled with the different colored body section of Fig. 1. In this manner, a variety of color combinations are possible. It is to be understood, that while the invention is primarily described with reference to changes in color, the body contour and contour of the head section may be varied in the different component elements so as to obtain a variety of composite assembled plugs of different shape. The body section carries a conventional multiple barbed fish hook 10, and the head section is shown as being fitted with a multiple barbed fish hook 11 and also a conventional eyelet 12 for the attachment of a leader or fishing line.

As shown most clearly in Fig. 4, the connectible ends of the body and head sections are fabricated with interfitting end faces, the end face of the body section being indicated at 13 and that of the head section at 14. Axially projecting from the end face 13 of the body section, there is provided an integrally formed connection bar 15 of substantially rectangular cross section. The head section is formed with an axially extending recess 16 having an open end lying in the face 14, this recess being arranged to receive endwise therein the connection bar 15. With this arrangement, a rigid interconnection is provided between the body and head sections, and due to the configuration of the connection bar, the sections are retained against relative rotational movement.

The connection bar 15 is latchingly secured against withdrawal from the recess 16 by means of a manually releasable latching mechanism which operates automatically upon insertion of the connection bar into the recess to latch the body section and head section in interconnected relationship yet permits easily and readily detaching these sections whenever desired.

More specifically the latching mechanism comprises a transverse passage in the head section, this passage extending transversely and in right angled relation to the recess 16. The transverse passage terminates at its ends in open ended recesses 17 and 18 which are axially aligned and interconnected through a contracted section 19. The bottom portion of the recess 18, it will be observed, extends into and communicates with the recess 16.

Reciprocably mounted in the recess 18 is a latching member of disc-like construction, this disc being of slightly greater height than the associated recess 16 so that the lowermost end of the latching member, as shown in Fig. 4, slightly extends beyond the wall of the recess 16 and into the recess 18, thus more effectively guiding the reciprocable movement of the latching member. The latching member is biased towards a latching position by means of a compression spring 21 positioned within the recess 18 and having one end bearing against the latching member, while the other end bears against a closure cap or end plug 22 at the open end of the recess 18. This plug may be a press fit or may be secured in position by any desired conventional means.

In the latching position of the latch member 20, as shown in Fig. 4, it will be noted that the latch member is disposed within the recess 16 in the path of movement of the connection bar 15. The latching member may be manually moved to an unlatched position outside of the recess 16 by means of a release button 23 positioned normally at the open end of recess 17. The release button is mounted upon a stem 24 extending through the contracted section 19 and connected at its other end to the latching member 20, thus forming a unitary assembly which may be reciprocably moved in one direction by the action of the spring 21 and in an opposite direction by manually applying pressure against the release button so as to move the assembly against the pressure of spring 21 and thus carry the latching member to an unlatched position.

In order for the latching member to function and retain the connection bar against withdrawal from the recess 16, the connection bar is constructed with an opening 25 of generally circular form and of sufficient diameter to receive the latching member endwise thereinto. The opening 25 communicates with an entrance slot 26 which is centrally disposed of the connection bar outer end and forms a passage from the outer end of the connection bar into the opening 25 through which the stem 24 may be relatively moved during insertion and withdrawal of the connection bar 15.

The outer end of the connection bar is rounded or bevelled to form a cam surface 27 which has a camming action with a cam surface 28 on the latching member such that when the connection bar 15 is inserted into the recess 16, the latching member will be forced out of the path of movement, and upon the opening 25 reaching a position of registration with the latching member, the latching member will be biased by the action of spring 21 into the opening 25 and thus latch the bar against withdrawal. When it is desired to separate the sections it is merely necessary to manually depress the release button 23 in order to move the latch member out of the opening 25 to an unlatched position permitting withdrawal of the connection bar 15.

A further unique feature of the present invention resides in the manner in which the center of gravity of the plug may be varied so as to change its action. Referring to Fig. 4, it is proposed to provide one or more recesses 29 which extend longitudinally of the plug axis and are outwardly spaced therefrom to form compartments for the disposition of sinker members as indicated at 30. The sinker compartments may be provided in either the body section or the head section of the plug, however, they are illustrated in this case as being positioned in the body section A, and as having their outer open end terminating in the face 13 thereof. The other section face, in this case the face 14 extends over the open end of the recesses 29, the head section in this case thus providing a cover to prevent displacement of the sinkers from the recess in which they are placed, yet providing an arrangement which permits shifting of the sinkers as desired simply by disconnecting the coupled plug sections.

Various modifications may suggest themselves to those skilled in the art without departing from the spirit of my invention, and, hence, I do not wish to be restricted to the specific form shown or uses mentioned, except to the extent indicated in the appended claims.

I claim:

1. A fish lure, comprising: a head section and a body section having ends engageable when in juxtaposed relation; a connection bar extending axially of one of said sections and projecting from its end, said bar having a side opening therein; a connection bar receiving recess in the end of the other section; a latch member in said latter section supported for movement in opposite directions at right angles to the longitudinal axis of said bar into latched and unlatched positions, said member in latched position extending into said opening and in unlatched position being withdrawn from said opening; spring means within said latter section biasing said latch member towards its latched position, said bar and latch member having camming surfaces coacting upon partial insertion of said bar into said recess for moving the latch member to unlatched position against said spring, but enabling movement of the latch member to latching position by said spring when the bar is fully inserted; and manually operable means for moving said latch member to unlatched position against the action of said spring means, whereby said sections may be separated.

2. A fish lure, comprising: a head section and a body section having ends engageable when in juxtaposed relation; a connection bar extending axially of one of said sections and projecting from its end, said bar having a transversely extending opening therein adjacent its outer end and a longitudinally extending entrance slot from said outer end into said opening; a connection bar receiving recess in the end of the other section; a transverse passage communicating with said recess; internal latching means contained wholly within the outer periphery of said other section including a latch member mounted in said passage for reciprocable movement and adapted to enter said recess and occupy a position in the line of movement of the entering bar; spring means biasing said member towards said position; and manually operable latch release means including a stem extending from said member on the opposite side thereof from said spring, said bar and member having cooperable camming surfaces acting upon insertion of the bar into said recess to move the latch member against said spring and permit relative movement of the stem through said slot and the registration of the latch member and said opening, whereupon said spring may force the member to a latching position in said opening.

3. In a fish lure: interchangeable head and body sections rigidly interconnectable in releasable end-to-end surface engagement, one of said sections having an axially extending recess with an entrance opening in its end surface; an axially extending connection bar projecting from the end surface of the other section, said bar having a transversely extending opening therein adjacent its outer end and a longitudinally extending entrance slot from said outer end into said opening; means defining a lateral transverse recess communicating with one side of said axially extending recess; latching means including an enlarged portion forming a latch member reciprocably mounted in said transverse recess, and a reduced portion forming a stem projecting from an opposite side of said axially extending recess from that of the transverse recess, said stem having an outer end surface normally flush with the outer surface of said one of said sections; spring means in said transverse recess normally biasing said latch member to a latching position projecting into the axially extending recess, and depression of the outer end surface of said stem acting to move the latch member from said axially extending recess into said lateral recess against said spring; and camming surfaces coacting between said connection bar and said latch member for moving said latch member into said lateral recess as said connection bar is moved to fully seated position, the stem passing through said entrance slot, whereupon in said seated position the latch member may move into latching position in said transversely extending opening of said connection bar.

References Cited in the file of this patent

UNITED STATES PATENTS

| 530,862 | Reed | Dec. 11, 1894 |
| 1,477,864 | Bolton | Dec. 18, 1923 |
| 2,441,302 | Watkin | May 11, 1948 |
| 2,640,292 | Nadolny | June 2, 1953 |

FOREIGN PATENTS

| 21,973 | Great Britain | Oct. 5, 1911 |